United States Patent [19]
Obayashi et al.

[11] Patent Number: 5,404,579
[45] Date of Patent: Apr. 4, 1995

[54] DUAL MODE MOBILE RADIO COMMUNICATION APPARATUS WITH FUNCTION FOR TRANSMITTING REMOTE CONTROL DATA

[75] Inventors: Arata Obayashi; Naoyuki Wakabayashi, both of Tokyo, Japan

[73] Assignee: Kabushiki Kaisha Toshiba, Kawasaki, Japan

[21] Appl. No.: 115,136

[22] Filed: Sep. 1, 1993

[30] Foreign Application Priority Data

Sep. 2, 1992 [JP] Japan .................. 4-234618

[51] Int. Cl.⁶ .................. H04Q 7/02; H04Q 7/04; H04Q 9/02
[52] U.S. Cl. .................. 455/74; 455/89; 455/33.1; 379/59; 375/216
[58] Field of Search .......... 455/126, 89, 74, 93, 455/102, 33.1; 375/5, 7; 379/58, 59, 63

[56] References Cited

U.S. PATENT DOCUMENTS 5,020,076  5/1991  Cahill et al. .................. 375/5
5,058,150  10/1991  Kang .................. 379/58
5,228,074  7/1993  Mizikovsky .................. 379/59

*Primary Examiner*—Curtis Kuntz
*Assistant Examiner*—Mary M. Lin
*Attorney, Agent, or Firm*—Banner, Birch, McKie & Beckett

[57] ABSTRACT

When remote control data has been input during calling in analog mode, a mobile radio communication apparatus according to the invention outputs a predetermined first voice frequency signal indicative of the remote control data and transmitting the signal to a radio link, and outputs the first voice frequency signal. Further, when remote control data has been input during calling in digital mode, the mobile radio communication apparatus outputs message data indicative of the remote control data and transmitting the message data to a radio link, generates a second voice frequency signal corresponding to the input remote control data and also the first voice frequency signal, and outputs the second voice frequency signal before the message data is transmitted.

23 Claims, 9 Drawing Sheets

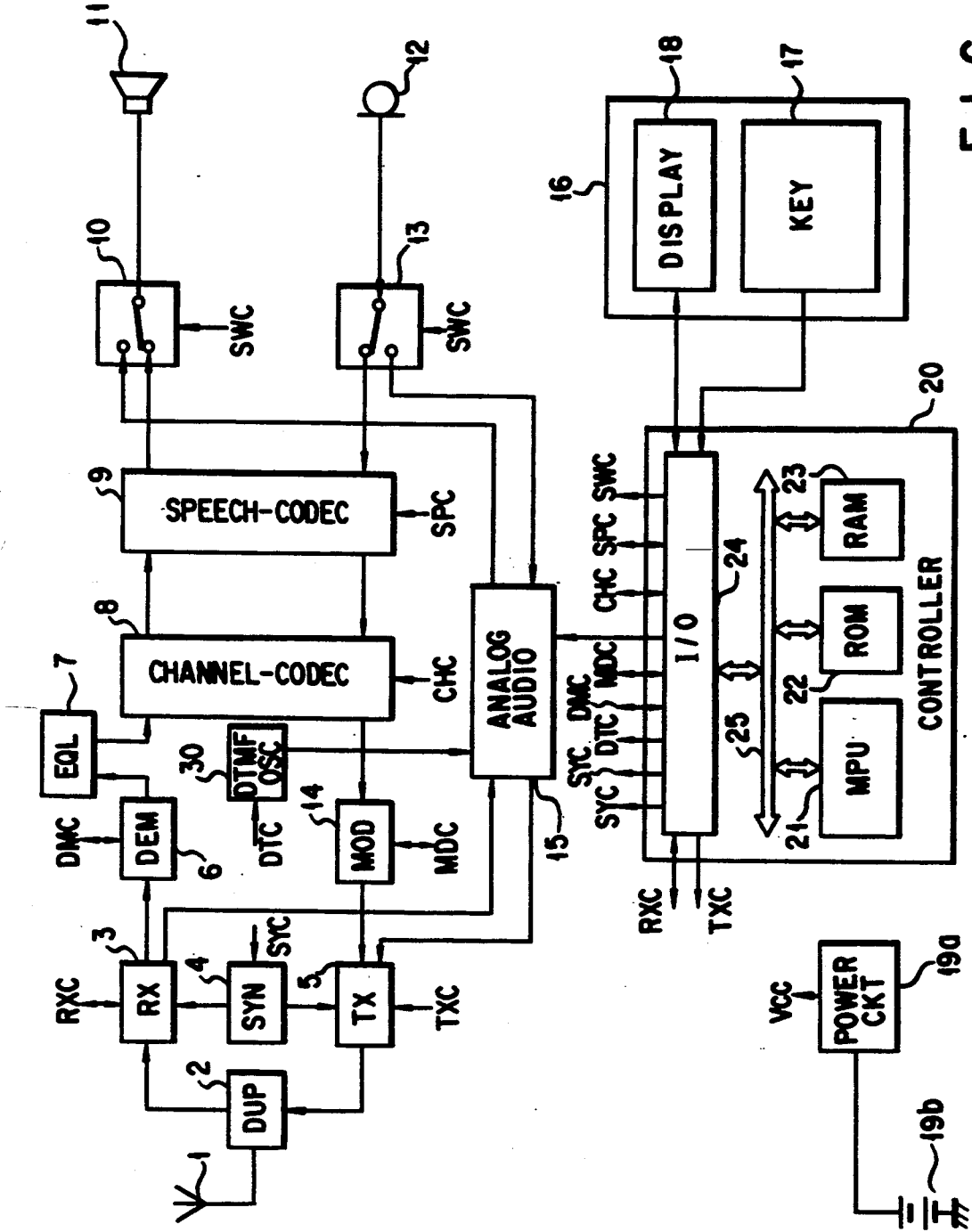

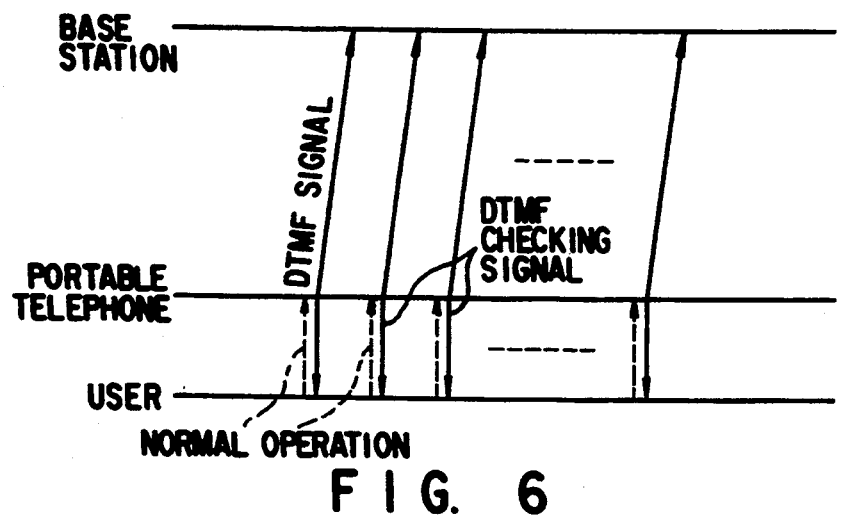
F I G. 6
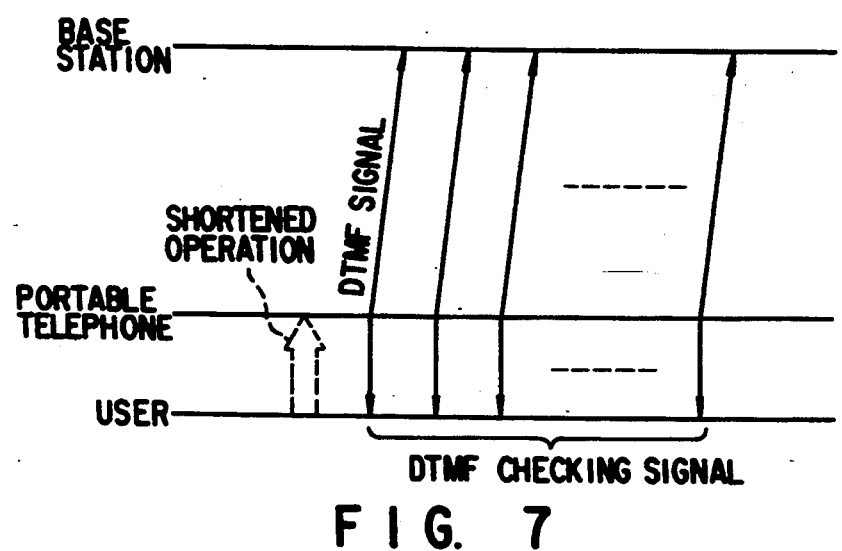
F I G. 7
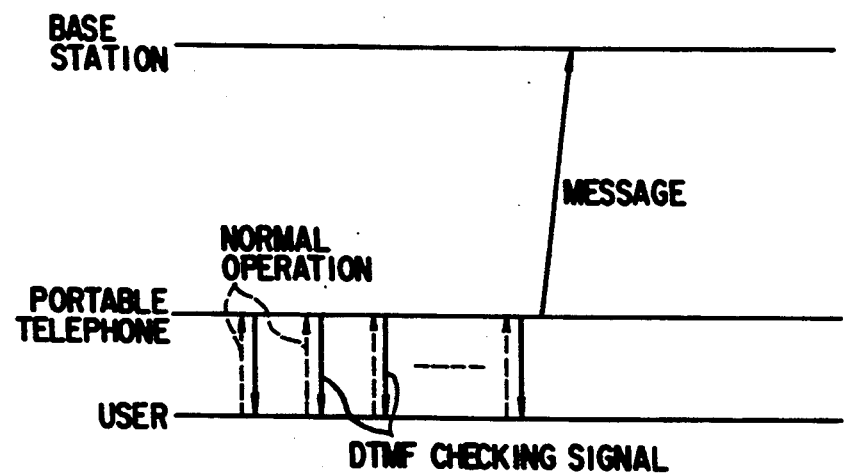
F I G. 8

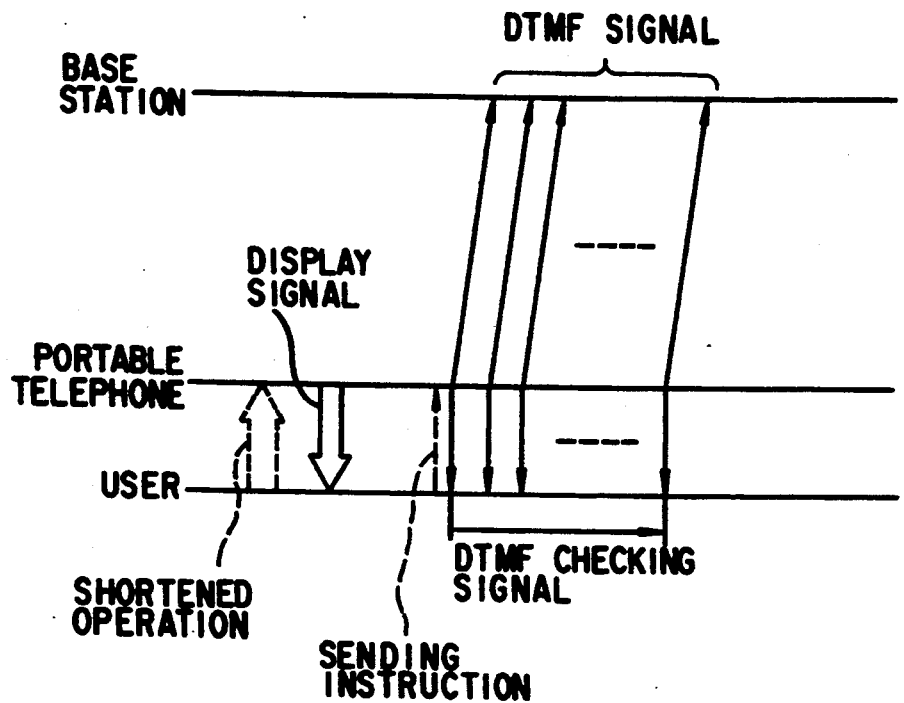
F I G. 12
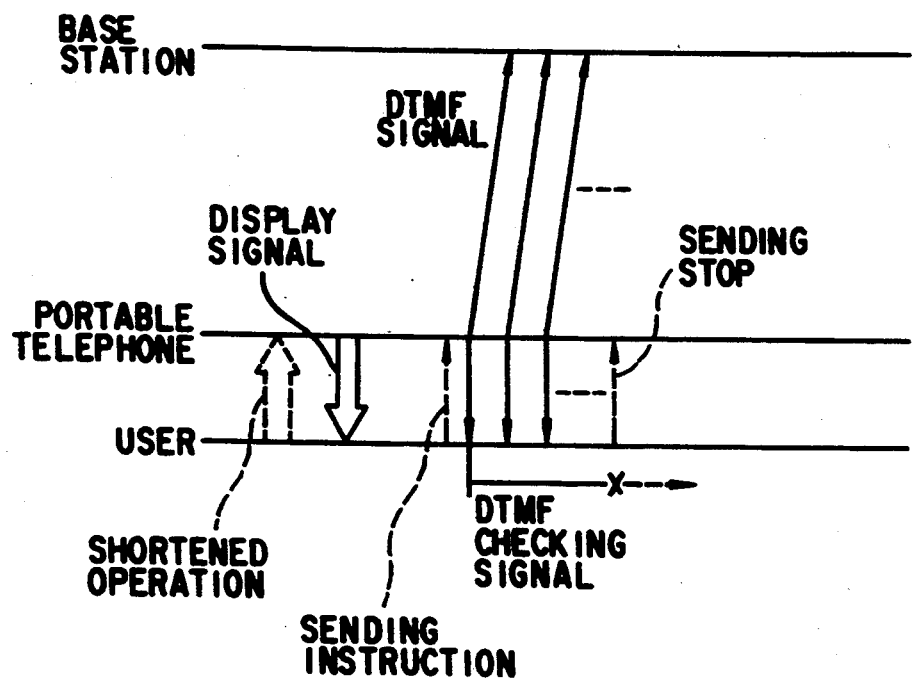
F I G. 13

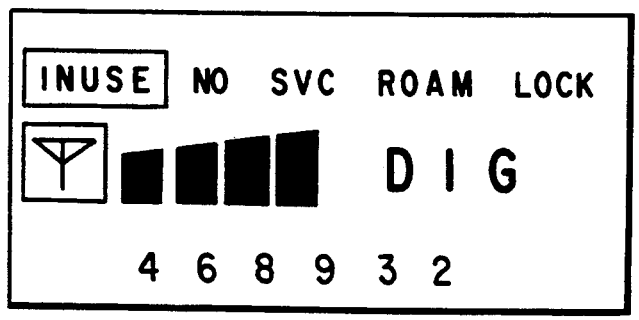
F I G. 17
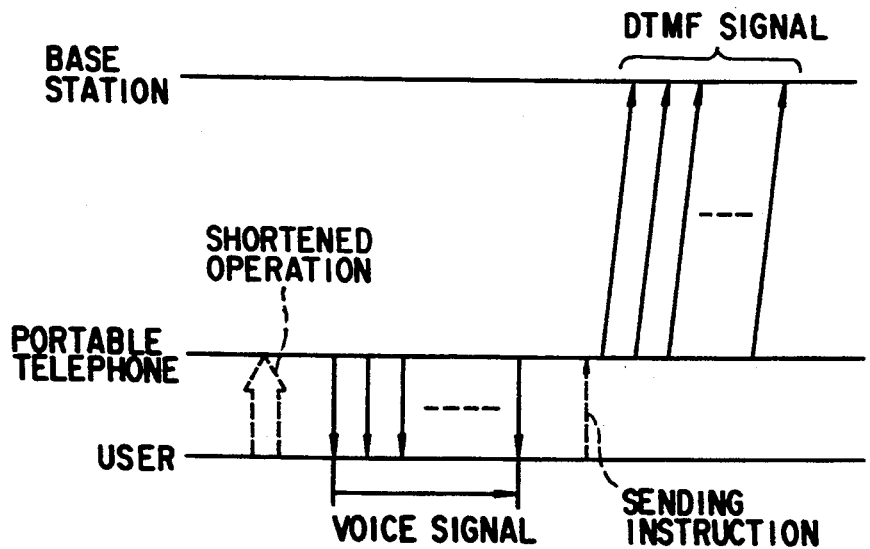
F I G. 18
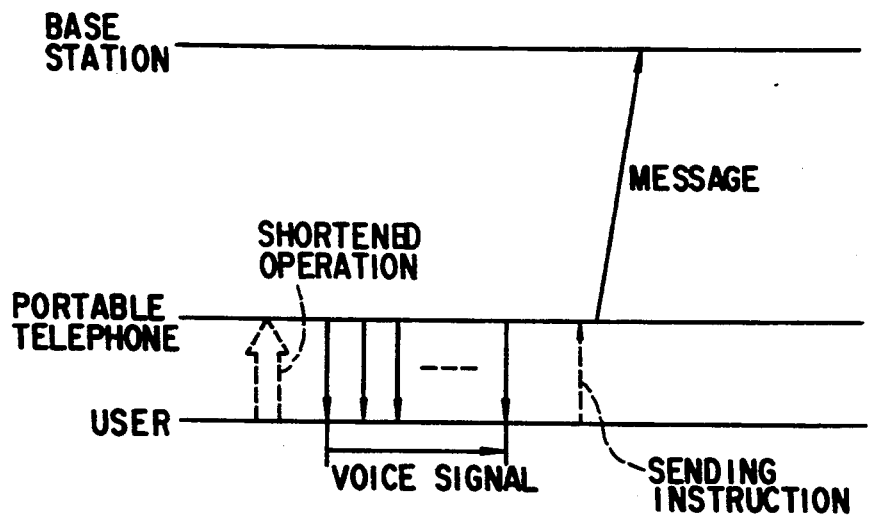
F I G. 19

DUAL MODE MOBILE RADIO COMMUNICATION APPARATUS WITH FUNCTION FOR TRANSMITTING REMOTE CONTROL DATA

BACKGROUND OF THE INVENTION

1. Field of the Invention

This invention relates to mobile radio communication apparatuses such as mobile telephones, portable telephones and cordless telephones, and more particularly to a dual mode mobile radio communication apparatus to be used as a mobile unit in a mobile radio communication system, which performs radio transmission of communication signals by selectively using analog and digital modes between a base station and the mobile unit.

2. Description of the Related Art

Recently, a dual mode system has been used in place of a conventional mobile radio communication system for performing radio transmission of communication signals of analog mode. Here, the "dual mode system" means a system which employs analog mode and digital mode.

In the analog mode system, a carrier wave is frequency-modulated in accordance with an analog voice signal and data in a transmission device, and the modulated wave is transmitted to a receiving device where the modulated wave is demodulated to thereby reproduce the analog voice signal and data. On the other hand, in the digital mode system, a voice signal and data are encoded in a transmission device, and carrier wave is subjected to digital modulation in accordance with the encoded signal and data by use of a $\pi/4$ shifted DQPSK (Differentially encoded Quadrature Phase Shift Keying) method. The modulated wave is transmitted from the transmission device to a receiving device, where the modulated wave is subjected to digital demodulation, and then the demodulated signal and data are decoded to thereby reproduce the voice signal and data.

In recent years, it has been proposed to employ a remote control function in a mobile radio communication apparatus for use in the above-described systems. This remote control function is means to perform remote control of a destination terminal with use of remote control data by transmitting the remote control data from the mobile radio communication apparatus to the destination terminal through a communication link established therebetween. This function is very convenient since it enables the user to reproduce and hear a message stored in a destination terminal (if the terminal is an answering telephone), or to contact a destination terminal so as to make, for example, ticket reservations from a remote place (if the terminal is dedicated to ticket reservation).

In the above-described dual mode mobile radio communication apparatus, however, the manner of transmission of remote control data differs depending upon whether the communication mode is analog mode or digital mode. The remote control data consists of a DTMF signal in the analog mode, whereas it consists of a message code in the digital mode. From the message code transmitted in the digital mode, the user cannot check whether or not he has performed correct operation and whether he has transmitted correct data, although he can check when the DTMF signal is transmitted in the analog mode.

SUMMARY OF THE INVENTION

It is a first object of the invention to provide a mobile radio communication apparatus capable of checking the sending operation and processing of remote control data irrespective whether the communication mode is analog mode or digital mode.

It is a second object of the invention to provide a mobile radio communication apparatus capable of checking the input operation of remote control data in units of one digit.

It is a third object of the invention to provide a mobile radio communication apparatus capable of sending remote control data simply, accurately and in a short time.

It is a fourth object of the invention to provide a mobile radio communication apparatus capable of stopping the transmission of remote control data at a time when a checking sound is being output, even after the input operation of the remote control data is completed.

It is a fifth object of the invention to provide a mobile radio communication apparatus allowing the user to see and confirm remote control data to be transmitted.

It is a sixth object of the invention to provide a mobile radio communication apparatus capable of transmitting remote control data after the user sees and confirms it.

It is a seventh object of the invention to provide a mobile radio communication apparatus capable of stopping the transmission of remote control data even after the data starts to be transmitted.

It is an eighth object of the invention to provide a mobile radio communication apparatus which has a simple and compact structure without a speaker dedicated to emission of a checking sound, and hence can be manufactured at low cost.

To attain the first object, the mobile radio communication apparatus employs first data sending means for analog mode, and second data sending means for digital mode, and checking sound output means. The first data sending means outputs a predetermined first voice frequency signal indicative of remote control data and transmits the signal to the radio link, when the remote control data is input by an operation means when the communication mode is analog mode. The second data sending means forms message data indicative of remote control data and transmits the message data to the radio link, when the remote control data is input by the operation means when the communication mode is digital mode. The checking sound output means outputs the first voice frequency signal generated by the first data sending means when the remote control data has been input in the analog mode, while generating a second voice frequency signal indicative of the remote control data input and outputting the generated second voice frequency signal, when the remote control data has been input in the digital mode.

Thus, when the input operation of the remote control data is performed, the voice frequency signal corresponding to the data is output as a checking sound, irrespective of whether the analog mode or digital mode is set. Accordingly, it is not necessary for the user to pay attention to the communication mode at the time of performing input operation of remote control data, and hence the user can easily perform the input operation without much consideration of erroneous operation.

To attain the second object, first data sending means generates the first voice frequency signal corresponding to one of the digits of the remote control data each time the digit has been input by means of the operation means, transmits the first voice frequency signal to the radio link, and causes the checking sound output means to output the first voice frequency signal generated by the first data sending means as a checking sound. Further, second data sending means generates message data corresponding to the digits of remote control data input by the operation means, then transmits the message data over the radio link, and causes the checking sound output means to output a second voice frequency signal corresponding to one of the digits of the remote control data each time the digit has been input by means of the operation means, and to output the second voice frequency signal as the checking sound.

Thus, a checking sound is outputted each time one digit of the remote control data has been input, irrespective of whether the analog mode or digital mode is set. As a result, the user can check whether one of the digits of the input data has been received each time he has input the digit.

To attain the third object, the apparatus of the invention has memory means which prestores remote control data. When shortened data corresponding to the remote control data stored in the memory means has been input by the operation means in the analog mode, first data sending means reads from the memory means remote control data corresponding to the shortened data and transmits a predetermined first voice frequency signal indicative of the read remote control data over the radio link, and checking sound output means outputs the predetermined first voice frequency signal. When the shortened data has been input by the operation means in the digital mode, message data indicative of the remote control data read from the memory means is created and transmitted to the radio link, a predetermined second voice frequency signal corresponding to the read remote control data is output, and the second voice frequency signal is emitted before the message data is transmitted.

By virtue of the above structure, if, for example, remote control data to be often used is prestored in the memory means, remote control data can be transmitted by a shortened simple operation only to designate a memory address stored in the memory means, irrespective of whether the analog mode or digital mode is set. Therefore, occurrence of input error of remote control data can be minimized, and hence the user can operate the apparatus with ease.

To attain the fourth object, first data sending means monitors whether or not sending stop data has been input by the operation means during the voice frequency signal being output by first checking sound output means. When no sending stop data has been input while the voice frequency signal is being transmitted, the first data sending means again transmits the voice frequency signal corresponding to each digit of the remote control data over the radio link, whereas when the sending stop data has been input during the time period, it stops the transmission of the remote control data.

Further, second data sending means monitors whether or not the sending stop data has been input by the operation means after remote control data consisting of a message data is generated and during a checking sound corresponding to the voice frequency signal indicative of the remote control data being outputted by second checking sound output means.

When no sending stop data has been input during the above-described time period, the second data sending means transmits the remote control data consisting of the message over the radio link, whereas when the sending stop data has been input during the time period, it stops the transmission of the remote control data consisting of the message data.

Accordingly, even after input operation of remote control data has been performed, transmission of the remote control data can be stopped by performing sending stop operation during a checking sound being output. This can prevent transmission of remote control data which, for example, has been erroneously input.

To attain the fifth object, the apparatus of the invention has display means for displaying remote control data. When remote control data has been input, it is displayed on the display means. Further, when shortened data has been input by the operation means, remote control data corresponding to the shortened data is read from memory means and displayed on the display means.

Thus, the user can see and confirm the remote control data to be transmitted so as to determine whether or not correct input operation has been performed.

To attain the sixth object, when remote control data is displayed on the display means, it is monitored whether sending instruction data has been input by the operation means. When the sending instruction data has been input, the remote control data displayed on the display means is transmitted to the radio link.

Thus, the user can confirm from the display screen whether or not the remote control data is correct, and hence can transmit the data only when it is correct.

To attain the seventh object, after transmission of remote control data is started upon sending instruction data being input, first data sending means monitors whether or not sending stop data has been input by the operation means, and stops the transmission of the remote control data when the sending stop data has been input.

As a result, even after transmissions of remote control data is started by the user once inputting the sending instruction data, the transmission can be stopped by the user inputting the sending stop data when he has found the transmission to be erroneous.

To attain the eighth object, a checking sound corresponding to a predetermined voice frequency signal is emitted from a call-signal outputting speaker. Thus, it is not necessary to employ any particular speaker dedicated to output of a checking sound, so that the apparatus can be made compact and simple in structure, thereby reducing the manufacturing cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram, showing a portable telephone according to the first embodiment of the invention;

FIG. 6 is a view, showing a remote control data-transmission sequence obtained when a normal sending operation is performed in the analog mode;

FIG. 7 is a view, showing a remote control data-transmission sequence obtained when a shortened sending operation is performed in the analog mode;

FIG. 8 is a view, showing a remote control data-transmission sequence obtained when the normal sending operation is performed in the digital mode;

FIG. 12 is a view, showing a remote control data-transmission sequence obtained when the shortened sending operation is performed in the analog mode in the case of a portable telephone according to a second embodiment of the invention;

FIG. 13 is a view, showing a remote control data-sending stop sequence obtained when the shortened sending operation is performed in the analog mode in the case of the portable telephone according to the second embodiment of the invention;

FIG. 17 shows an example of remote control data obtained by the sequence of FIG. 14;

FIG. 18 is a view, showing a remote control data-transmission sequence obtained when the shortened sending operation is performed in the analog mode in the case of a portable telephone according to another embodiment of the invention; and FIG. 19 is a view, showing a remote control data-transmission sequence obtained when the shortened sending operation is performed in the digital mode in the case of the portable telephone according to the another embodiment of the invention.

DETAILED DESCRIPTION OF THE PREFERRED EMBODIMENTS

First Embodiment

Figures 1, 3:
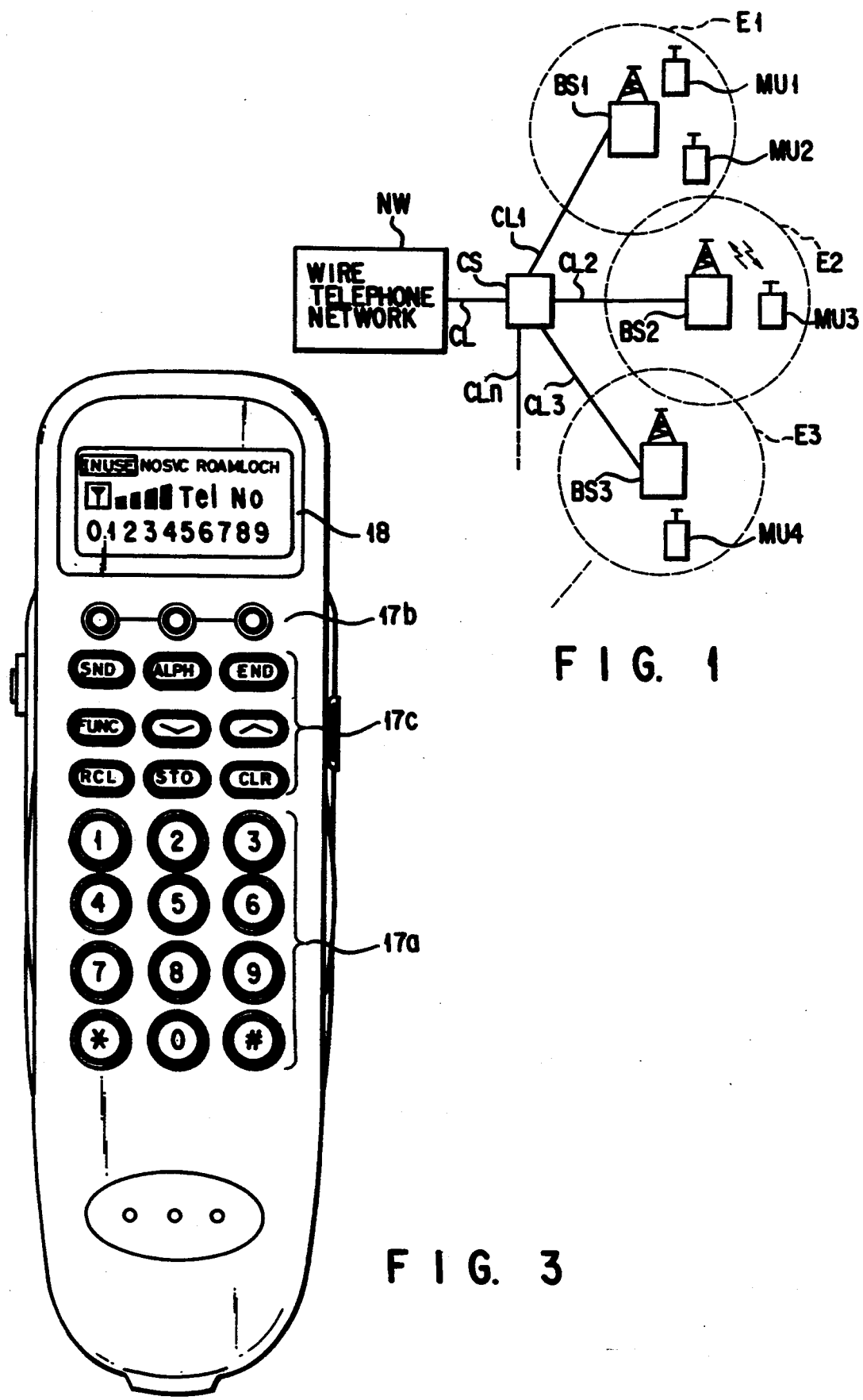
FIG. 1 is a schematic view, showing a dual mode cellular radio communication system according to a first embodiment of the invention.
FIG. 3 is a view, showing a console section of the portable telephone shown in FIG. 2.

FIG. 1 shows a dual mode cellular radio communication system according to a first embodiment of the invention.

This system has a control station CS, a plurality of base stations, for example, BS1-BS3, and a plurality of mobile units, for example, MU1-MU4. The control station CS is connected to a wire telephone network NW through a wire circuit CL. The base stations BS1-BS3 are connected to the control station CS through wire circuits CL1-CL3, respectively. The base stations BS1-BS3 form radio zones E1-E3 called cells, respectively. The mobile units MU1-MU4 located in the radio zones E1-E3 are connected to the base stations BS1-BS3 through radio channels. The radio channels are sorted into a control channel group and a call channel group. The call channel group consists of a plurality of analog call channels of analog mode and a plurality of digital call channels of digital mode.

The mobile units MU1-MU4 can be sorted into portable telephone units and mobile telephone units. FIG. 2 shows the portable telephone units.

As is shown in FIG. 2, a radio frequency signal, supplied from each of the base stations BS1-BS3 through a corresponding one of the digital call channels when digital mode is set, is received by an antenna 1 and then input to a receiver 3 via a duplexer 2. The receiver 3 combines the radio frequency signal with a receiver oscillation signal output from a frequency synthesizer 4, thereby forming an intermediate frequency signal. The frequency of the receiver oscillation signal output from the frequency synthesizer 4 is controlled by a channel control signal SYC output from a controller 20.

The intermediate frequency signal is converted into a digital signal by means of an A/D converter (not shown), and is then input to a digital demodulator 6. The demodulator 6 demodulates the digital signal into a digital base band signal. The digital base band signal includes a digital call signal and a digital control signal DMC. The digital control signal DMC is supplied to the controller 20, where the signal is recognized. On the other hand, the digital call signal has its demodulated waveform equalized by means of an equalizer 7, and is then supplied to a channel-encoder/decoder (hereinafter referred to as "channel-codec") 8. The channel-codec 8 performs decoding processing for correcting an error in the digital call signal supplied from the equalizer 7, and outputs the corrected digital call signal to a speech-encoder/decoder (hereinafter referred to as "speech-codec") 9.

The speech-codec 9 performs speech decoding processing of the corrected digital call signal. The call signal output from the speech-codec 9 is converted to an analog call signal by means of a D/A converter (not shown), and is then input to an analog switch 10. The switch 10 is controlled by a switch control signal SWC supplied from the controller 20 so that the switch selectively outputs the analog call signal output from the speech-codec 9 when digital mode is set. Thus, the call signal output from the speech-codec 9 is supplied to a speaker 11 via the analog switch 10, and a speech corresponding to the call signal is output therefrom.

On the other hand, a transmission signal output from a microphone 12 is input to an analog switch 13. The switch 13 is controlled by the switch control signal SWC supplied from the controller 20 so that the switch selectively inputs the transmission signal to the speech-codec 9 when the digital mode is set. Thus, the transmission signal is converted into a digital transmission signal by means of an A/D converter (not shown), and is then input to the speech-codec 9.

The speech-codec 9 performs speech encoding processing of the digital transmission signal. The digital transmission signal output from the speech-codec 9 is input to the channel-codec 8, together with the digital control signal supplied from the controller 20. The channel-codec 8 performs encoding for correcting errors in the digital transmission signal and the digital control signal. The encoded digital transmission signal is input to a digital modulator 14. The modulator 14 generates a modulation signal obtained by subjecting the digital transmission signal to the $\pi/4$ shifted DQPSK modulation. The modulation signal is converted into an analog signal by means of a D/A converter (not shown), and is then input to a transmitter 5. The transmitter 5 synthesizes the modulation signal and a transmitter oscillation signal output from the frequency synthesizer 4, into a radio transmission signal which has high frequency and high amplitude. This radio transmission signal is output to the antenna 1 via the duplexer 2, and is then transmitted to the base station.

On the other hand, a radio frequency signal, supplied from each of the base stations BS1–BS3 through a corresponding one of the digital call channels when analog mode is set, is received by the antenna 1 and then input to the receiver 3 via the duplexer 2. The receiver 3 converts the radio frequency signal into an intermediate frequency signal, which is output to an analog audio circuit 15. The circuit 15 performs frequency demodulation of the intermediate frequency signal, and then performs speech amplification of the same. The analog call signal output as the base band signal from the analog audio circuit 15 is input to the analog switch 10. The switch 10 is controlled by the switch control signal SWC supplied from the controller 20, such that the switch selectively outputs the analog call signal when the analog mode is set. Thus, the analog call signal output from the analog audio circuit 15 is supplied to the speaker 11 via the analog switch 10, and a speech corresponding to the call signal is output therefrom.

A transmission signal output from the microphone 12 is input to the analog switch 13. The switch 13 is controlled by the switch control signal SWC supplied from the controller 20 so that the switch selectively inputs the transmission signal to the analog audio circuit 15 when the analog mode is set. Thus, the transmission signal is input to the analog audio circuit 15 via the analog switch 13. The circuit 15 generates a modulation signal obtained by subjecting the transmission signal to FM modulation, and inputs the modulation signal to the transmitter 5. The transmitter 5 combines the modulation signal and a transmitter oscillation signal output from the frequency synthesizer 4, into a radio frequency signal which has high frequency and high amplitude. This radio frequency signal is output to the antenna 1 via the duplexer 2, and is then transmitted to the base station.

The analog audio circuit 15 is connected to a DTMF oscillation circuit (DTMF-OSC) 30. The circuit 30 oscillates a DTMF signal in response to an oscillation control signal DTC, and supplies the DTMF signal to the analog audio circuit 15. The circuit 15 supplies the DTMF signal to the transmitter 5 in response to an instruction output from the controller 20, and supplies the speaker 11 with the same signal via the analog switch 10. Upon receiving the signal, the speaker 11 outputs a checking sound.

A console unit 16 has a key switch group 17 and a display 18.

FIG. 3 is a front view of the portable telephone unit, showing the specific arrangement of the key switch group 17 and the display 18. The display 18 consists, for example, of a liquid crystal display (LCD), and displays information on the operative condition of the telephone unit and on the telephone number of a destination terminal, etc., in response to a signal supplied from the controller 20.

The key switch group 17 consists of digit keys 17a, one-touch dial keys 17b, and a function key group 17c. The function key group 17c has a sending (SEND) key to be operated to transmit a call signal, an end (END) key to be operated to finish the call, an alphabet input (ALPH) key to be operated to input an alphabet character, a function (FUNC) key, a pair of volume control keys, a recall (RCL) key to be used to display various information stored in a RAM, hereinafter referred to, a store (STO) key to be used to store into the RAM information input by use of the digit keys 17a, and a clear (CLR) key to be used to delete information stored in the RAM. The function key is operated to selectively designate the analog mode and the digital mode, or to designate mode for transmitting a data signal such as a facsimile image data signal.

A power source circuit 19a generates a desired operation voltage Vcc on the basis of the output of a battery 19b, and supplies the voltage to the above-described various circuits.

The controller 20 has a microprocessor (MPU) 21 connected to a ROM 22, a RAM 23, and an input/output port (I/O) 24 via a bus 25. The ROM 22 prestores all control programs and some control data items, which are necessary for radio communication. The RAM 23 stores the other control data items, and telephone numbers or data on remote control input by use of the keys 17, etc. The microprocessor 21 performs various control processes relating to radio communication in accordance with the control programs and control data items stored in the ROM 22 and the control data items stored in the RAM 23. These control processes include a control process relating to transmission of remote control data by which the invention is characterized.

Transmission of remote control data performed in the above-described portable telephone unit will now be explained.

Figure 4:
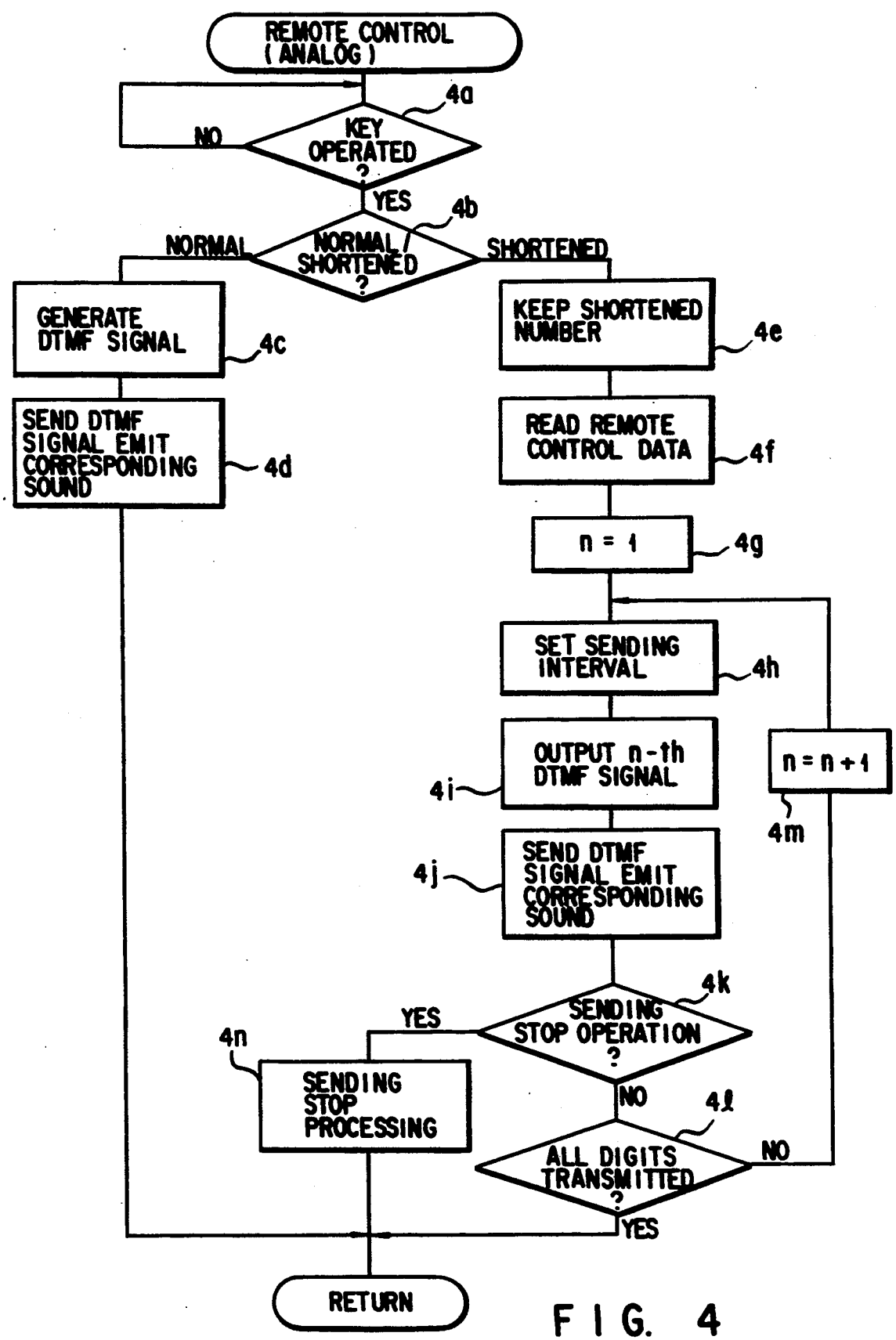
FIG. 4 is a flowchart, useful in explaining the procedure of remote control in analog mode performed in the control circuit of the portable telephone shown in FIG. 2.

Referring to FIG. 4, during calling in the analog mode, the controller 20 monitors, in a step 4a, whether or not key operation to transmit remote control data is performed while it performs various control processes.

When the user has performed the key operation, to transmit remote control data to a destination terminal, the controller 20 determines from the kind of a first-digit key whether the key operation is a normal sending operation or a shortened sending operation (step 4b). The normal sending operation means an operation performed by inputting all the digits of remote control data with use of digit keys 17a only, whereas the shortened sending operation is an operation for designating an address for accessing the repertory memory of the RAM 23 to read remote control data therefrom. In the normal sending operation, only digit keys 17a, for example, keys: "3", "2", "7", "4", ..., "5" are operated. Similarly, in the shortened sending operation, for example, "RCL" keys, which indicate the shortened sending operation, are successively operated for the first and second digits, and then digit keys "0" and "1" are operated to designate an address "0, 1" for accessing the repertory memory of the RAM 23.

When the user has input "3" as the first digit, as described above, the controller 20 determines in a step 4b that the key operation to be successively performed is a normal sending operation, and executes steps 4c and 4d. In the step 4c, the controller 20 supplies the DTMF generation circuit 30 with a control signal which causes the circuit 30 to generate a DTMF signal corresponding to "3". In the step 4d, the controller 20 supplies the analog audio circuit 15 with a control signal for causing the DTMF generation circuit 30 to be connected to the call-sending line and call-receiving line of the analog audio circuit 15. As a result, the circuit 30 generates the DTMF signal corresponding to "3" for a predetermined time period. This DTMF signal is supplied to the transmitter 5 via the analog audio circuit 15, where the signal is converted into a radio frequency signal and transmitted to the base station. At the same time, the DTMF signal is supplied from the analog audio circuit 15 to the speaker 11 via the analog switch 10. The speaker 11 in turn outputs a checking sound.

Each time the user operates one of the digit keys 17a to input one digit, a DTFM signal corresponding to the input digit is generated from the DTMF generator 30. This DTMF signal is transmitted as remote control data to the base station, and is also transmitted to the speaker 11 to cause it to emit a sound for confirming the input operation. Accordingly, the user can confirm from the DTFM checking sound whether remote control data has correctly been received or transmitted.

FIG. 6 shows a sequence of signals obtained when the above-described analog mode, normal sending operation is performed.

On the other hand, if the user inputs "RCL" for the first and second digits, then the controller 20 determines in the step 4b that the shortened sending operation has been performed, and the program proceeds to a step 4e. In the step 4e, digits "0" and "1", input following to "RCL", are kept as an address. Then, in a step 4f, the repertory memory in the RAM 23 is accessed on the basis of the address to read remote control data prestored in the repertory memory.

Then, the controller 20 initializes to "1" a variable n indicative of a digit position in s step 4g, and sets a predetermined time interval in a step 4h. Subsequently, in a step 4i, the controller 20 supplies the DTMF signal generator 30 with a control signal for causing the generator 30 to generate a DTMF signal corresponding to the n-th digit of the remote control data. In a step 4j, the controller 20 supplies a control signal for connecting the generator 30 to the call-sending line and call-receiving line of the analog audio circuit 15. Thus, the generator 30 generates the DTMF signal corresponding to the n-th digit of the remote control data. This DTMF signal is supplied to the transmitter 5 via the analog audio circuit 15, where the signal is converted to a radio frequency signal and transmitted to the base station. At the same time, the DTMF signal is supplied from the circuit 15 to the speaker 11 via the analog switch 10. Upon receiving the signal, the speaker 11 outputs a checking sound.

After the DTMF signal corresponding to the n-th digit is transmitted and a sound is emitted for confirming the transmission of the signal, the controller 20 determines in a step 4k whether or not a sending stop operation has been performed. Thereafter, in a step 4l, it is determined whether or not all digits of the remote control data have been transmitted. If the sending stop operation is not performed and there remains a digit which has not yet been transmitted, the controller 20 increases the digit position n by 1 in a step 4m and then returns to the processing of the step 4h. After the controller 20 again sets the predetermined interval (e.g., 0.5-1 sec.) in the step 4h, it performs the processing of the steps 4i and 4j, where a DTFM signal corresponding to the next digit is transmitted and its checking sound is emitted.

Thus, DTMF signals corresponding to the digits of the remote control data read from the repertory memory of the RAM 23 are sequentially transmitted at regular intervals, and at the same time their checking sounds are emitted. Therefore, the user can confirm from the checking sounds that the remote control data has been correctly transmitted.

FIG. 7 shows a sequence of signals obtained when the above-described analog mode, shortened sending operation is performed.

Figure 10:
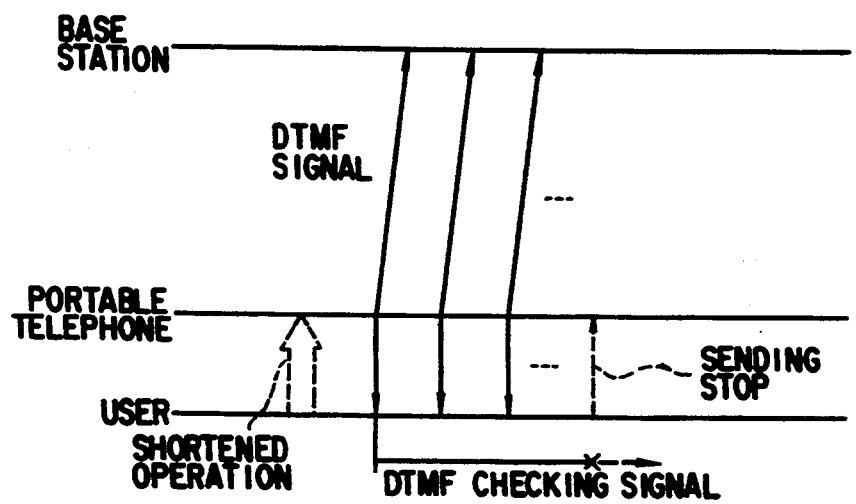
FIG. 10 is a view, showing a remote control data-sending stop sequence obtained when the shortened sending operation is performed in the analog mode.

Further, suppose that the user has performed, as is shown in FIG. 10, the sending stop operation during when a DTMF checking sound is being output since he has found the key operation erroneous. The sending stop operation is performed by, for example, combining the RCL key and the CLR key. Upon detection of the sending stop operation in a step 4k, the controller 20 controls the program to proceed to a step 4n, and executes the sending stop process. In this process, transmission of further DTMF signals and emission of further checking sounds are canceled.

Thus, when the user finds an erroneous key operation, he can stop transmission of remote control data by effecting the sending stop operation, even after the shortened sending operation is performed.

Figure 5:
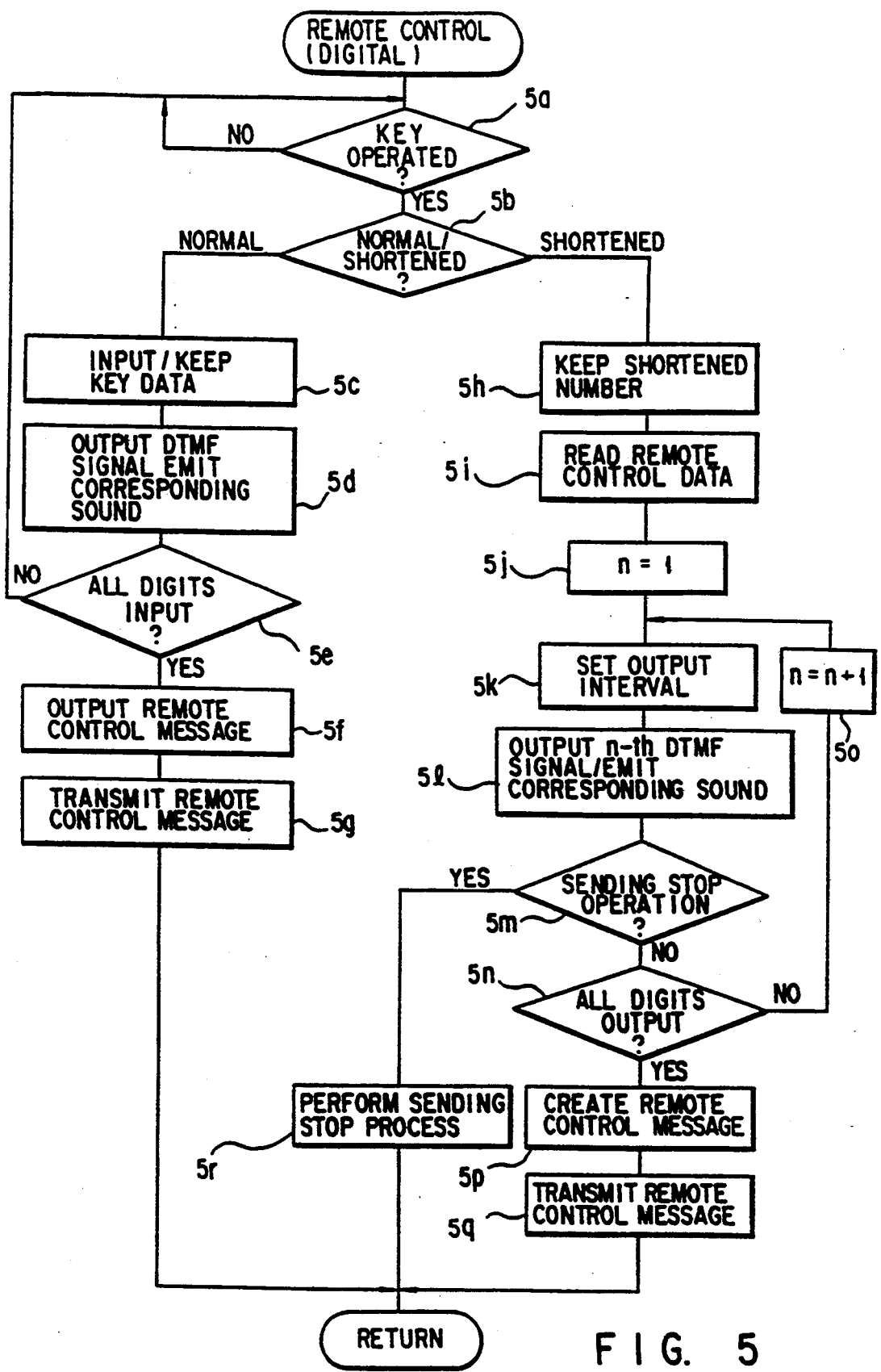
FIG. 5 is a flowchart, useful in explaining the procedure of remote control in digital mode performed in the control circuit of the portable telephone shown in FIG. 2.

Moreover, the following control is performed during digital mode calling. The controller 20 monitors the key operation in a step 5a of FIG. 5 while performing various control processes relating to a call.

When the user has input all digits of remote control data by operating digit keys 17a, the controller 20 determines in a step 5b that this input operation is the normal sending operation, and controls the program to proceed to steps 5c and 5d. In the step 5c, digit information input by means of the digit keys 17a is stored in the RAM 23. In the step 5d, the controller 20 supplies the analog switch 10 with a switch control signal for temporarily connecting the analog switch 10 to the analog audio circuit 15, and supplies the analog audio circuit 15 with a control signal for connecting the DTMF signal generator 30 to the call-receiving line of the circuit 15. In this state, the controller 20 supplies the DTMF signal generator 30 with a control signal which causes the generator 30 to generate a DTMF signal corresponding to the input digit information. Thus, the generator 30 generates a DTMF signal corresponding to the digit information. This signal is supplied from circuit 15 to the speaker 11 via the analog switch 10. The speaker 11 emits a checking sound upon receipt of the signal.

Then, the controller 20 determines in a step 5e whether or not all digits of the remote control data have been input. If not, the program returns to the step 5a, where input of information for the next digit is awaited. Similarly, each time data for one digit has been input, a DTMF signal corresponding to the information is output from the DTMF signal generator 30, and its checking sound is emitted from the speaker 11.

When all digits of the remote control data have been input and stored, the controller 20 sequentially executes processing of steps 5f and 5g. In the step 5f, a remote control message is created on the basis of the remote control data stored in the RAM 23. In the step 5g, the created message is supplied to the channel-codec 8, where it is subjected to encoding for correction of any error therein. Then, the corrected message is converted to a modulation signal by means of the digital modulation circuit 14, and is supplied to the transmitter 5. The transmitter 5 converts the modulation signal to a radio frequency signal, and transmits the same to the base station. Thus, the remote control message is inserted into call data and transmitted.

FIG. 8 shows a sequence of signals obtained when the above-described digital mode, normal sending operation is performed. As is evident from FIG. 8, a DTMF checking sound corresponding to a digit of remote control data is emitted each time the user has input the digit, as in the case of the analog mode normal sending operation shown in FIG. 6. Accordingly, the user can perform the normal sending operation of remote control data, irrespective of whether the operation is performed in the digital mode or in the analog mode.

In addition, when the user has performed the shortened sending operation by inputting "RCL", "RCL", "0", and "1", the controller 20 recognizes, in the step 5b, from the successive "RCL"s input for the first and second digits that the shortened sending operation has been performed, and hence performs control for shortened sending processing.

First in a step 5h, two digits "0" and "1" input following to the two "RCL"s are stored as an address. Subsequently, in a step 5i, the repertory memory of the RAM 23 is accessed in accordance with the address, and remote control data prestored in the memory is read out. Then, the controller 20 initializes to "1" a variable n indicative of the position of a digit in a step 5j, and sets a predetermined time interval in a step 5k. In a step 5l, the controller 20 supplies the analog switch 10 with a switch control signal for temporarily connecting the analog switch 10 to the analog audio circuit 15, and supplies the analog audio circuit 15 with a control signal for connecting the DTMF signal generator 30 to the call-receiving line of the circuit 15. In this state, the controller 20 supplies the DTMF signal generator 30 with a control signal for causing the generator 30 to generate a DTMF signal indicative of the n-th digit of the remote control data. Thus, the generator 30 generates a DTMF signal indicative of the n-th digit. This signal is supplied from circuit 15 to the speaker 11 via the analog switch 10. The speaker 11 emits a checking sound upon receipt of the signal.

After a checking sound for the DTMF signal corresponding to the n-th digit has been emitted, the controller 20 determines in a step 5m whether or not the sending stop operation has been performed. In a step n, the controller 20 determines whether or not DTMF checking sounds corresponding to all digits of the remote control data have been emitted. If the sending stop operation is not performed and there remains a digit whose DTMF checking sound has not yet been emitted, the controller 20 increases the digit position by 1 in a step 5o and then returns to the step 5k. After the controller 20 sets a predetermined time interval (e.g., 0.5–1 sec.) in the step 5k, it causes generation of a DTMF checking sound for the next digit in the step 5l.

Thus, DTMF checking sounds corresponding to all digits of the remote control data read from the repertory memory of the RAM 23 are emitted at regular intervals.

When DTMF signals corresponding to all digits of the remote control data have been output, the controller 20 sequentially executes steps 5p and 5q. In the step 5p, a remote control message indicative of the remote control data read from the repertory memory of the RAM 23 is created. In the step 5q, the created message is supplied to the channel-codec 8, where it is subjected to encoding for correction of any error therein. Then, the corrected message is converted to a modulation signal by means of the digital modulation circuit 14, and is supplied to the transmitter 5. The transmitter 5 converts the modulation signal to a radio frequency signal, and transmits the same to the base station. Thus, the remote control message is inserted into call data and transmitted.

Figure 9:
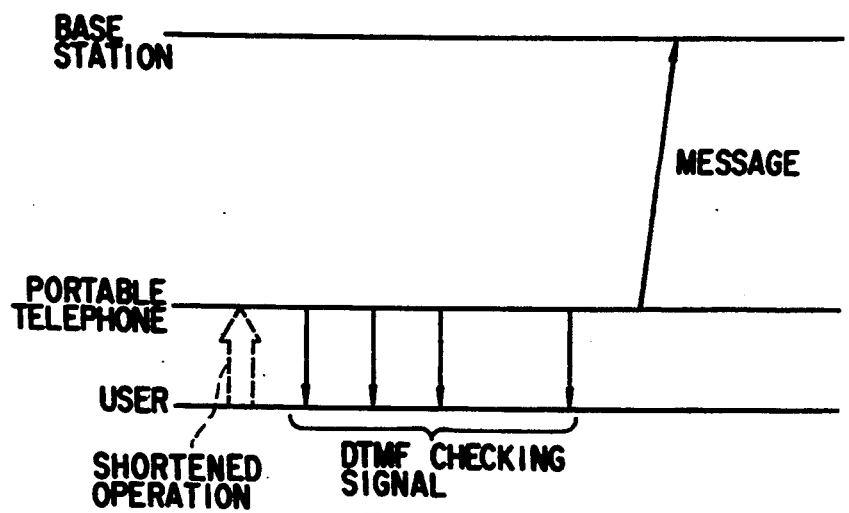
FIG. 9 is a view, showing a remote control data-transmission sequence obtained when the shortened sending operation is performed in the digital mode.

FIG. 9 shows a sequence of signals obtained when the above-described digital mode shortened sending operation is performed. As is evident from FIG. 9, DTMF checking sounds corresponding to all digits of remote control data are sequentially emitted after the user performs the shortened sending operation, as in the case of the shortened sending operation of the analog mode shown in FIG. 7. Accordingly, the user can perform the shortened sending operation of remote control data, irrespective of whether the operation is performed in the digital mode or in the analog mode.

Figure 11:
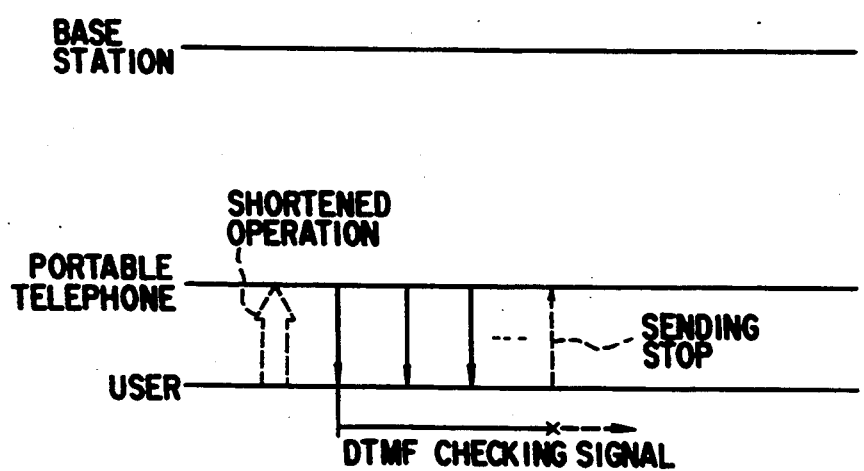
FIG. 11 is a view, showing a remote control data-sending stop sequence obtained when the shortened sending operation is performed in the digital mode.

Further, suppose that the user has performed, as is shown in FIG. 11, the sending stop operation during when a DTMF checking sound is being output since he has found the key operation erroneous. The sending stop operation is performed by, for example, combining the RCL key and the CLR key. Upon detection of the sending stop operation in the step 5m, the controller 20 controls the program to proceed to a step 5r, and executes the sending stop process. In this process, transmission of further DTMF signals and emission of further checking sounds are canceled.

Thus, so long as a DTMF checking sound is being output, the user can stop transmission of remote control data by effecting the sending stop operation even after the shortened sending operation is performed.

As described above, irrespective of whether analog mode or digital mode is set, a DTMF checking sound is output in the same manner each time one digit of remote control data has been input by a normal sending operation. Accordingly, the user can perform inputting/sending operation of remote control data, without paying attention to whether the communication mode is analog mode or digital mode.

Further, in the above embodiment, remote control data items which are often transmitted are prestored in the repertory memory of the RAM 23, and are sent by a shortened sending operation. Thus, they can be sent simply, accurately and in a short time, as compared to, every time, inputting all digits of remote control data by operating the digit keys 17a. Moreover, in the case of the shortened sending operation, too, a DTMF checking sound is output in the same manner irrespective of whether analog mode or digital mode is set. Therefore, the user can perform inputting/sending operation of remote control data, without paying attention to the communication mode.

In addition, in the above embodiment, whether a sending stop operation has been effected is monitored during when a DTMF checking sound is being output after the shortened sending operation is performed. When the sending stop operation has been performed, shortened sending processing of remote control data is stopped. Thus, when the input operation is found to be erroneous from the DTMF checking sound or the like, transmission of the remote control data can be stopped by effecting the sending stop operation during when the DTMF checking sound is being output. As a result, erroneous remote control data can be prevented from being transmitted. This sending stop operation can be performed both in the analog mode and in the digital mode.

In the case of the normal sending operation in which all digits of remote control data are input by the digit keys 17a, a corresponding DTMF signal or message is transmitted each time one digit of the data has been input. Thus, the one digit will have been transmitted when it is found to be erroneous. In this case, however, erroneous processing at a destination terminal due to erroneous data can be avoided by stopping the input of a further digit of the data and again inputting the data from its first digit, since data which has not completely been transmitted serves merely as a meaningless data fragment.

Second Embodiment

In a portable telephone according to a second embodiment of the invention, remote control data, which is read from the repertory memory of the RAM 23 when the shortened sending operation has been performed in the analog mode or the digital mode, is displayed on the liquid crystal display 18 and its sending instruction is monitored. Further, in accordance with the sending instruction, the remote control data is sent and a DTMF checking sound is emitted.

Figure 16:
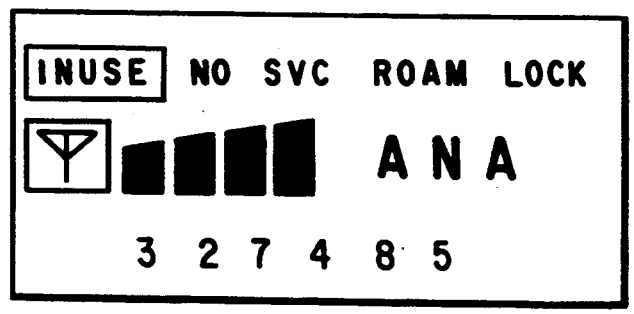
FIG. 16 shows an example of remote control data obtained by the sequence of FIG. 12.

Specifically, when the user has effected a shortened sending operation during analog mode calling as shown in FIG. 12, the controller 20 reads remote control data designated by the shortened sending operation from the repertory memory of the RAM 23, and displays on the liquid crystal display 18. FIG. 16 shows an example of a display image. In this example, remote control data "327485" is displayed. In this state, the controller 20 monitors a sending instruction and a sending stop operation. The sending instruction has been performed by combining the RCL key and the CLR key.

When the sending instruction has been performed, the controller 20 controls the DTMF signal oscillator 30 to sequentially generate at regular intervals DTMF signals corresponding to the digits of the remote control data. Thereafter, as is shown in FIG. 12, the controller 20 transmits the DTMF signals from the transmitter 5 to the base station, and causes the speaker 11 to emit checking sounds corresponding to the DTMF signals.

Further, during the DTMF checking sound being output, the controller 20 monitors whether the sending stop operation has been performed. If the sending stop operation has been performed as shown in FIG. 13, the controller 20 stops transmission of a further DTMF signal, and restores the calling state.

Figure 14:
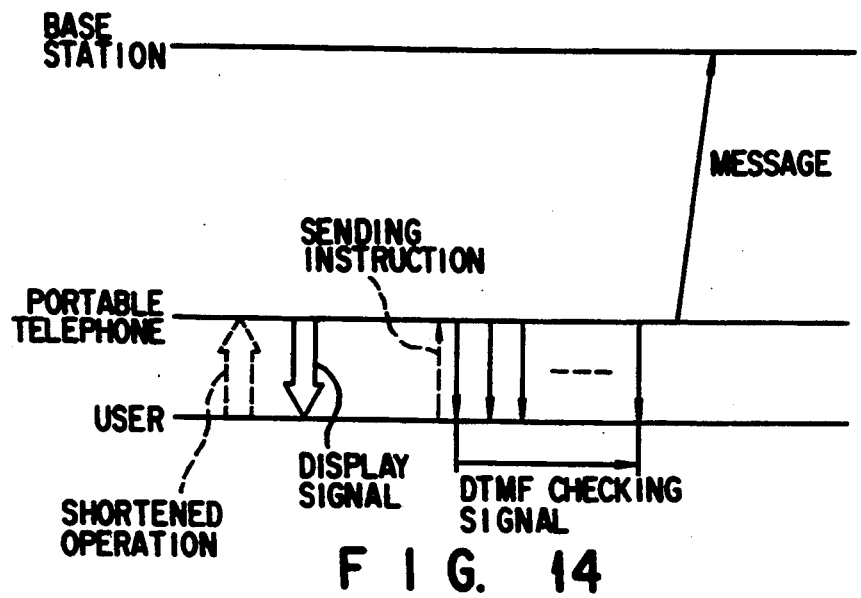
FIG. 14 is a view, showing a remote control data-transmission sequence obtained when the shortened sending operation is performed in the digital mode in the case of the portable telephone according to the second embodiment of the invention.

On the other hand, if the shortened sending operation has been performed during digital mode calling as shown in FIG. 14, the controller 20 reads remote control data designated by the operation from the repertory memory of the RAM 23, and displays the data on the liquid crystal display 18. FIG. 17 shows an example of a display image. In this example, remote control data "468932" is displayed. In this state, the controller 20 monitors a sending instruction and a sending stop operation.

When the sending instruction has been performed, the controller 20 controls the DTMF signal oscillator 30 to sequentially generate at regular intervals DTMF signals corresponding to the digits of the remote control data. Thereafter, as is shown in FIG. 14, the controller 20 causes the speaker 11 to emit checking sounds corresponding to the DTMF signals. After DTMF checking sounds corresponding to all digits of the remote control data are emitted, the controller 20 finally generates a remote control message indicative of the remote control data, and transmits the message to the base station.

Figure 15:
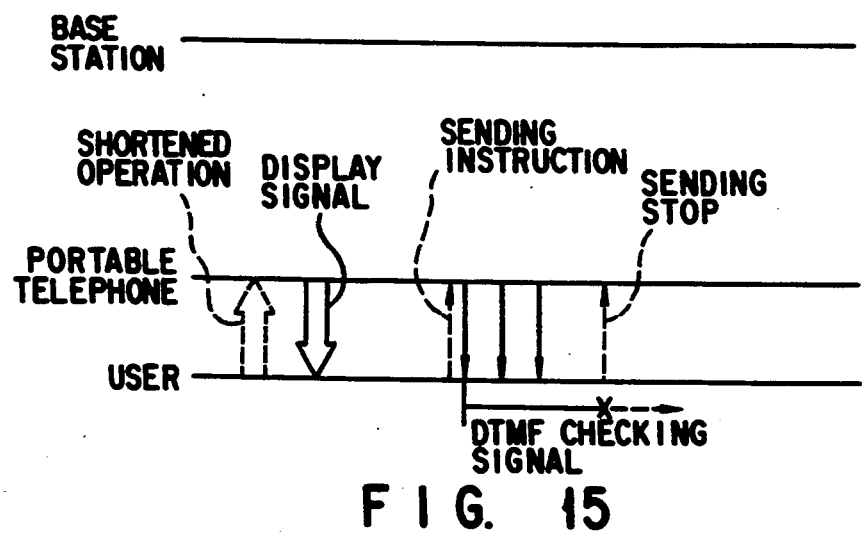
FIG. 15 is a view, showing a remote control data-sending stop sequence obtained when the shortened sending operation is performed in the digital mode in the case of the portable telephone according to the second embodiment of the invention.

Further, during the DTMF checking sound being output, the controller 20 monitors whether the sending stop operation has been performed. If the sending stop operation has been performed as shown in FIG. 15, the controller 20 stops emission of a further DTMF checking sound, and cancels transmission of a further remote control message.

As described above, in the second embodiment, too, the same operation is performed and DTMF checking sounds are emitted both in the analog mode and in the digital mode. Thus, the user can perform an operation for transmitting remote control data without paying attention to the communication mode.

Moreover, in this embodiment, remote control data is once displayed on the liquid crystal display 18 when the shortened sending operation has been performed, irrespective of whether the analog mode or the digital mode is set. In this state, if the sending instruction operation has been performed, a DTMF signal is generated and its checking sound is emitted. Therefore, the user can confirm from the displayed image whether or not the remote control data is correctly designated, and then perform the instruction operation. As a result, transmission of erroneous remote control data can reliably be prevented. Further, the remote control data can be checked also from the DTMF checking sound.

Furthermore, when the sending stop operation has been performed during the DTMF checking sound being output, transmission of further remote control data is stopped. This enables transmission of the remote control data to be stopped even when the data is found to be erroneous after the sending instruction operation has been performed.

The present invention is not limited to the above-described embodiments. For example, although in the second embodiment, remote control data is displayed on the liquid crystal display 18 when the shortened sending operation has been performed, all digits of the remote control data input by the normal sending operation may successively be displayed on the display 18. This structure enables the user to perform input operation of remote control data while checking display images on the display 18, as well as DTMF checking sounds. Accordingly, input errors can be further reduced.

In addition, although a checking sound corresponding to a DTMF signal is emitted in the first and second embodiments, this may be modified such that a particular sound synthesizer is employed for emitting a sound indicative of each digit of remote control data. FIG. 18 shows a sequence of analog mode signals obtained when a synthesized sound is output as a checking sound, while FIG. 19 shows a sequence of digital mode signals obtained when a synthesized sound is output as a checking sound.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A mobile radio communication apparatus employing a dual mode cellular radio system in which a communication signal is transmitted in a selected one of analog mode and digital mode over a radio link established between the mobile radio communication apparatus and a base station, comprising:
   mode determination means for determining whether the communication mode is the analog mode or the digital mode;
   operation means for inputting remote control data to perform remote control of a destination terminal;
   first data sending means for generating a predetermined first sound frequency signal indicative of the remote control data and sending the first sound frequency signal over the radio link, when the remote control data has been input by the operation means in a state where the mode determination means determines that the communication mode is the analog mode;
   second data sending means for forming message data indicative of the remote control data and sending the message data over the radio link, when the remote control data has been input by the operation means in a state where the mode determination means determines that the communication mode is the digital mode;
   outputting means for outputting the first sound frequency signal generated by the first data sending means when the remote control data has been input in the analog mode, and for generating a second sound frequency signal corresponding to the remote control data and outputting the generated second sound frequency signal, when the remote control data has been input in the digital mode; and
   a speaker for outputting checking sounds corresponding to said first and second sound frequency signals.

2. The mobile radio communication apparatus according to claim 1, wherein:
   the remote control data includes a plurality of digits;
   the first data sending means generates a predetermined first sound frequency signal corresponding to one of the digits of the remote control data each time the digit has been input by the operation means, and sends the predetermined first sound frequency signal to the radio link;
   the second data sending means includes means for storing the digits of remote control data input by the operation means, wherein the second data sending means stores all the digits of the remote control data, and then sends message information indicative of the digits of remote control data over the radio Link; and
   the outputting means outputs, when the analog mode is set, the first sound frequency signal generated by the first data sending means corresponding to one of the digits of the remote control data each time the digit has been input by the operation means, and outputs, when the digital mode is set, the second sound frequency signal.

3. The mobile communication apparatus according to claim 1, wherein:
   the remote control data includes a plurality of digits;
   the first data sending means includes means for storing the digits of remote control data input by the operation means, and the first data sending means stores all of the digits of the remote control data, then generates the first sound frequency signals corresponding to the digits of the remote control data at regular intervals, and sends the first sound frequency signals over the radio link;
   the second data sending means includes means for storing the digits of remote control data input by the operation means, and the second data sending means stores all of the digits of the remote control data, and then sends the message information indicative of the digits of remote control data over the radio link; and
   the outputting means generates the second sound frequency signal corresponding to one of the digits of the remote control data each time the digit has been input, and outputs the second sound frequency signal to said speaker.

4. The mobile radio communication apparatus according to claim 1, wherein the outputting means includes DTMF signal generating means for generating DTMF signals corresponding to the digits of the remote control data, the DTMF signals being output by said speaker as checking sounds.

5. The mobile radio communication apparatus according to claim 1, wherein the outputting means includes voice synthesizing means for generating voice signals indicative of each digit of the remote control data, the voice signals being output by said speaker as a checking sound.

6. The mobile radio communication apparatus according to claim 1, further comprising display means for displaying the remote control data input by the operation means.

7. The mobile radio communication apparatus according to claim 1, wherein the outputting means comprises means for generating the first and second sound frequency signal, the first and second sound frequency signal being supplied to the speaker.

8. A mobile radio communication apparatus employing a dual mode cellular radio system in which a communication signal is transmitted in a selected one of analog mode and digital mode over a radio link established between the mobile radio communication apparatus and a base station, comprising:
   mode determination means for determining whether the communication mode is the analog mode or the digital mode;
   memory means prestoring remote control data for performing remote control of a destination terminal;
   operation means for inputting shortened data for designating the remote control data stored in the memory means;
   first data sending means for reading from the memory means remote control data corresponding to the shortened data and sending a predetermined first sound frequency signal indicative of the read remote control data over the radio link, when the shortened data has been input by the operation means in a state where the mode determination means determines that the communication mode is the analog mode;

second data sending means for reading from the memory means remote control data corresponding to the shortened data and sending message data indicative of the read remote control data over the radio link, when the shortened data has been input by the operation means in a state where the mode determination means determines that the communication mode is the digital mode;

outputting means for outputting the first sound frequency signal generated by the first data sending means when the shortened data has been input in the analog mode, and for generating a second sound frequency signal corresponding to the first sound frequency signal and also the remote control data read from the memory means and outputting the second sound frequency signal, when the shortened data has been input in the digital mode; and a speaker for outputting checking sounds corresponding to said first and second frequency signals.

9. The mobile radio communication apparatus according to claim 8, wherein:

the first data sending means monitors whether or not sending stop data has been input by the operation means while the first sound frequency signal is being sent over the radio link, and stops transmission of the first sound frequency signal when the sending stop data has been input while the first sound frequency signal is being sent; and the second data sending means monitors whether or not sending stop data has been input by the operation means while the second sound frequency signal is being output by the outputting means, and stops transmission of the message data when the sending stop data has been input while the second sound frequency signal is being output.

10. The mobile radio communication apparatus according to claim 8, further comprising display means for displaying the remote control data input by the operation means.

11. The mobile radio communication apparatus according to claim 10, wherein:

the first data sending means monitors whether or not sending instruction data has been input by the operation means while the remote control data read from the memory means is displayed on the display means, and sends the first sound frequency signal corresponding to the displayed remote control data over the radio link;

the second data sending means monitors whether or not sending instruction data has been input by the operation means while the remote control data read from the memory means is displayed on the display means, and sends the message data indicative of the displayed remote control data over the radio link; and the outputting means outputs the first sound frequency signal generated by the first data sending means when the sending instruction data has been input in the analog mode, whereas when the sending instruction data has been input in the digital mode, the outputting means outputs the second sound frequency signal corresponding to the remote control data displayed on the display means before the message data is sent by the second data sending means.

12. The mobile radio communication apparatus according to claim 11, wherein:

the first data sending means monitors whether or not sending stop data has been input by the operation means while the first sound frequency signal is transmitted after the sending instruction data is input, and stops the transmission of the first sound frequency signal when sending stop data has been input; and the second data sending means monitors whether or not the sending stop data has been input by the operation means while the second sound frequency signal is output after the sending instruction data is input, and stops the transmission of the message data when sending stop data has been input while the second sound frequency signal is output.

13. The mobile radio communication apparatus according to claim 10, wherein the first and second data sending means monitor whether or not sending stop data has been input by the operation means while the remote control data read from the memory means is displayed on the display means, and stop transmission of a further sound frequency signal and further message data when the sending stop data has been input.

14. The mobile radio communication apparatus according to claim 8, wherein the outputting means includes DTMF signal generation means for generating a DTMF signal indicative of the remote control data, and the DTMF signal is output from said speaker as checking sounds.

15. The mobile radio communication apparatus according to claim 8, wherein the outputting means includes voice synthesizing means for generating a voice signal indicative of the remote control data, and the voice signal is output by said speaker as checking sounds.

16. A mobile radio communication apparatus employing a dual mode cellular radio system in which a communication signal is transmitted in a selected one of analog mode and digital mode over a radio link established between the mobile radio communication apparatus and a base station, comprising:

mode determination means for determining whether the communication mode is the analog mode or the digital mode;

memory means prestoring remote control data for performing remote control of a destination terminal;

operation means for selectively inputting the remote control data stored in the memory means and shortened data for designating the remote control data in the memory means;

input determination means for determining whether data input by the operation means is the shortened data or the remote control data;

first data sending means for generating a predetermined first sound frequency signal indicative of the remote control data and sending the first sound frequency signal over the radio link, when the remote control data has been input by the operation means in a state where the mode determination means determines that the communication mode is the analog mode;

second data sending means for forming message data indicative of the remote control data and sending the message data over the radio link, when the remote control data has been input by the operation means in a state where the mode determination means determines that the communication mode is the digital mode;

third data sending means for reading from the memory means remote control data corresponding to the shortened data and sending a third sound frequency signal indicative of the read remote control data over the radio link, when the shortened data has been input by the operation means in a state where the mode determination means determines that the communication mode is the analog mode;

fourth data sending means for reading from the memory means remote control data corresponding to the shortened data and sending message data indicative of the read remote control data over the radio link, when the shortened data has been input by the operation means in a state where the mode determination means determines that the communication mode is the digital mode;

first outputting output means for outputting the first sound frequency signal generated by the first data sending means when the remote control data has been input in the analog mode, and for generating a second sound frequency signal indicative of the remote control data input and outputting the generated second sound frequency signal, when the remote control data has been input in the digital mode;

second outputting means for outputting the third sound frequency signal generated by the third data sending means when the shortened data has been input in the analog mode, and for generating a fourth sound frequency signal corresponding to the remote control data read from the memory means and outputting the generated fourth sound frequency signal before the message data is transmitted by the fourth data sending means, when the shortened data has been input in the digital mode;

a speaker for outputting checking sounds corresponding to the first, second, third, and fourth sound frequency signals.

17. A dual-mode mobile radio communication apparatus for transmitting radio frequency signals over a radio link to a base station, comprising:

a console unit for generating calling information signals from calling information input by a user;

a control circuit, responsive to said calling information signals, for generating sound frequency control signals, first control signals for digital mode calling operations, and second control signals for analog mode calling operations;

a sound frequency generator for generating sound frequency signals corresponding to the input calling information in response to said sound frequency control signals;

digital processing circuitry for generating digital mode calling signals corresponding to the input calling information in response to said first control signals, and for outputting said digital mode calling signals;

analog processing circuitry, coupled to said sound frequency generator, having a first output for outputting said sound frequency signals in response to said second control signals and a second output for outputting said sound frequency signals in response to any one of said first control signals and said second control signals;

a transmitter, coupled to the output of said digital processing circuitry and to the first output of said analog processing circuitry, for (1) modulating said digital mode calling signals with radio frequency signals and for transmitting said modulated radio frequency signals over the radio link for digital mode communications and (2) modulating said sound frequency signals with radio frequency signals and transmitting said modulated radio frequency signals over the radio link for analog mode communications; and a speaker, coupled to said second output of said analog processing circuitry, for outputting checking sounds corresponding to said sound frequency signals.

18. The dual-mode mobile radio communication apparatus according to claim 17, wherein:

said console unit comprises a keypad and said calling information signals comprise a series of keystroke signals; and said control circuit comprises a memory for storing each of said keystroke signals when performing a digital mode calling operation, wherein said control circuit generates sound frequency control signals, first control signals, and second control signals so that (1) when performing digital mode operations, said speaker outputs checking sounds after each of said keystroke signals is generated and said transmitter begins transmitting said modulated radio frequency signals after said series of keystroke signals is generated; and (2) when performing analog mode operations, said speaker outputs checking sounds and said transmitter transmits said modulated radio frequency signals after each of said keystroke signals is generated.

19. The dual-mode mobile radio communication apparatus according to claim 17, wherein said control circuit comprises:

a memory for storing calling data;

means for accessing said calling data in response to said calling information signals; and means for generating said first control signals and said sound frequency signals from the stored calling data.

20. The dual-mode mobile radio communication apparatus according to claim 17, wherein said sound frequency generator comprises a DTMF generator for generating DTMF sound frequency signals.

21. The dual-mode mobile radio communication apparatus according to claim 17, wherein said console unit further comprises a display for providing a display indicative of the calling information.

22. The dual-mode mobile radio communication apparatus according to claim 17, wherein said sound frequency generator comprises:

a DTMF generator for generating DTMF sound frequency signals; and voice synthesizing means for synthesizing a voice signal, wherein said analog circuitry outputs said DTMF sound frequency signals from said first output to said transmitter in response to said second control signals and outputs said voice signals from said second output to said speaker to thereby produce voice sounds in response to any one of said first control signals and said second control signals.

23. The dual mode mobile radio communication apparatus according to claim 17, wherein:
   said console unit comprises means for generating a stop signal from stop information input by the user; and
   said control circuit, responsive to said stop signal, stops said sound frequency generator from generating sound frequency signals and stops transmission of said modulated radio frequency signals.

* * * * *